US008522179B1

United States Patent
Griesbach et al.

(10) Patent No.: US 8,522,179 B1
(45) Date of Patent: Aug. 27, 2013

(54) SYSTEM AND METHOD FOR MANAGING TIMING MARGIN IN A HIERARCHICAL INTEGRATED CIRCUIT DESIGN PROCESS

(75) Inventors: William R. Griesbach, Pocono Lake, PA (US); Vishwas Rao, Breinigsville, PA (US); Joseph J. Jamann, Nazareth, PA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/367,094

(22) Filed: Feb. 6, 2012

(51) Int. Cl.
*G06F 17/50* (2006.01)

(52) U.S. Cl.
USPC ........... 716/108; 716/102; 716/103; 716/104; 716/105

(58) Field of Classification Search
USPC .......................................... 716/102–105, 108
See application file for complete search history.

(56) References Cited

U.S. PATENT DOCUMENTS

| | | | | |
|---|---|---|---|---|
| 5,581,473 A * | 12/1996 | Rusu et al. | ..................... | 716/113 |
| 5,778,216 A * | 7/1998 | Venkatesh | ..................... | 713/503 |
| 6,701,498 B2 * | 3/2004 | Becker et al. | .................. | 716/108 |
| 6,704,697 B1 * | 3/2004 | Berevoescu et al. | ............ | 703/19 |
| 6,845,494 B2 * | 1/2005 | Burks et al. | .................... | 716/108 |
| 6,925,621 B2 * | 8/2005 | Mielke et al. | ................. | 716/103 |
| 6,954,915 B2 * | 10/2005 | Batchelor | ...................... | 716/113 |
| 7,146,583 B1 * | 12/2006 | Sun et al. | ....................... | 716/113 |
| 7,356,451 B2 * | 4/2008 | Moon et al. | ...................... | 703/19 |
| 7,577,928 B2 * | 8/2009 | Lindberg et al. | ............... | 716/106 |
| 7,669,155 B2 * | 2/2010 | Ganesan et al. | ............... | 716/100 |
| 7,689,953 B1 * | 3/2010 | Newmark et al. | ............. | 716/113 |
| 7,739,639 B2 * | 6/2010 | Molina et al. | ................. | 716/115 |
| 8,239,798 B1 * | 8/2012 | Goyal et al. | ................... | 716/113 |
| 8,281,269 B2 * | 10/2012 | Shibatani et al. | ............. | 716/111 |
| 8,341,573 B2 * | 12/2012 | Rao et al. | ....................... | 716/108 |
| 2008/0209379 A1 | 8/2008 | Nakamori | | |
| 2011/0022998 A1 * | 1/2011 | Rao et al. | ...................... | 716/108 |

* cited by examiner

*Primary Examiner* — Naum Levin

(57) ABSTRACT

A system for, and method of, generating block timing constraints and a timing model. In one embodiment, the system includes a hierarchical modeling tool configured to: (1) generate a model file, (2) receive at least one abstracted view margin, at least one timing environment margin and at least one operational margin for inclusion in the model file, (3) generate block implementation timing constraints employing the at least one timing environment margin and the at least one operational margin and (4) generate a block timing model employing the at least one abstracted view margin and the at least one operational margin.

20 Claims, 3 Drawing Sheets

SYSTEM AND METHOD FOR MANAGING TIMING MARGIN IN A HIERARCHICAL INTEGRATED CIRCUIT DESIGN PROCESS

TECHNICAL FIELD

This application is directed, in general, to integrated circuit (IC) design and, more specifically, to a system and method for managing timing margin in a hierarchical integrated circuit (IC) design process.

BACKGROUND

Modern digital logic devices offer unprecedented performance. For a variety of digital ICs, speed, level of integration (i.e., transistor density) and capabilities have improved. Moreover, in many cases, these performance improvements have been accompanied by reductions in size, power consumption and cost of the devices. However, these benefits have required greater complexity in digital logic design. Because of this complexity, the investment of time and resources by the manufacturer to design and fabricate a digital logic device has increased. For this same reason, the possibility of a mistake or oversight on the part of the designer has become more likely, and costlier to correct.

As digital logic devices have continued to evolve, hierarchical design techniques have become valuable as an approach for managing their complexity. At each hierarchical level, logic elements are formed from combinations of simpler elements. At the lowest hierarchical level of the design, the elements include fundamental devices, such as gates and flip-flops. The top hierarchical level of the design (often referred to as the "parent") defines the interconnection of complex logic elements, each of which is made up of elements defined at intermediate hierarchical levels. When elements are used at higher levels in a hierarchical design, their internal structure is not visible—they are treated as "black boxes." The hierarchical approach thus simplifies the design process, since the designer must contend only with the complexity within a single hierarchical level.

Circuit designers use electronic design automation (EDA) tools, a category of computer aided design (CAD) tools, to design and lay out electronic circuits, including simulating the operation of the circuit, determining where cells (i.e., logic elements including devices, e.g., transistors) should be placed and where the interconnects that couple the cells together should be routed. EDA tools allow designers to construct a circuit and simulate its performance using a computer and without requiring the costly and lengthy process of fabrication. EDA tools are indispensable for designing modern ICs, particularly very-large-scale integrated circuits (VLSICs). For this reason, EDA tools are in wide use.

One such EDA tool performs timing signoff. Timing signoff is one of the last steps in the IC design process and ensures that signal propagation speed (i.e., delay) in a newly-designed circuit is such that the circuit will operate as intended. Signals that propagate too slowly through the circuit cause setup violations; signals that propagate too quickly through the circuit cause hold violations. Setup or hold violations frustrate the logic of the circuit and prevent it from performing the job it was designed to do.

SUMMARY

One aspect provides a system for generating block timing constraints and a timing model. In one embodiment, the system includes a hierarchical modeling tool configured to: (1) generate a model file, (2) receive at least one abstracted view margin, at least one timing environment margin and at least one operational margin for inclusion in the model file, (3) generate block implementation timing constraints employing the at least one timing environment margin and the at least one operational margin and (4) generate a block timing model employing the at least one abstracted view margin and the at least one operational margin.

Another aspect provides a method of generating block timing constraints and a timing model. In one embodiment, the method includes: (1) generating a model file, (2) receiving at least one abstracted view margin, at least one timing environment margin and at least one operational margin for inclusion in the model file, (3) generating block implementation timing constraints employing the at least one timing environment margin and the at least one operational margin and (4) generating a block timing model employing the at least one abstracted view margin and the at least one operational margin.

Yet another aspect provides a computer-readable storage medium containing program instructions for generating block timing constraints and a timing model. In one embodiment, execution of the program instructions by one or more processors of a computer system cause the one or more processors to: (1) generate a model file, (2) receive at least one abstracted view margin, at least one timing environment margin and at least one operational margin for inclusion in the model file, (3) generate block implementation timing constraints employing the at least one timing environment margin and the at least one operational margin and (4) generate a block timing model employing the at least one abstracted view margin and the at least one operational margin.

BRIEF DESCRIPTION

Reference is now made to the following descriptions taken in conjunction with the accompanying drawings, in which.

DETAILED DESCRIPTION

Figure 1:
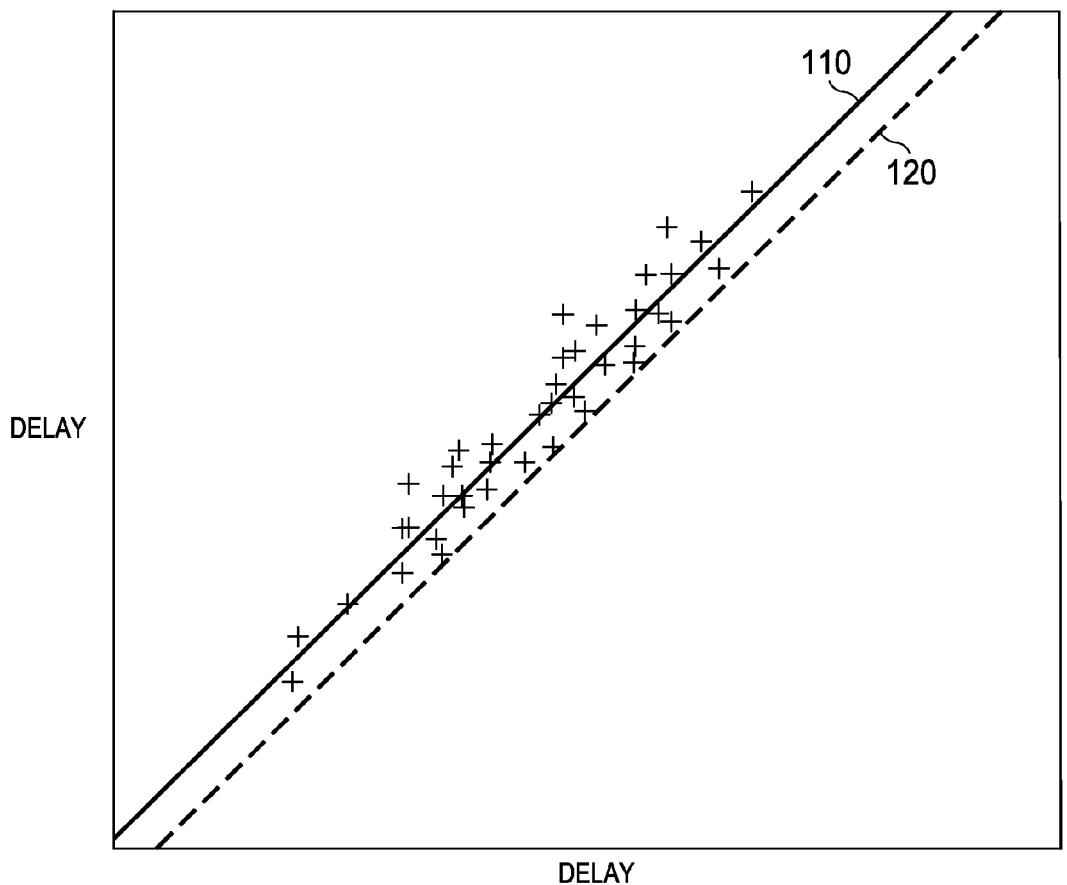
FIG. 1 is a diagram comparing timing arcs associated with top-level implementation and signoff modeling methods and representing an abstracted view margin.

Performing timing signoff on a hierarchical design in a concurrent fashion requires representations or models of the timing of the lower level blocks before they are completed. The timing representations or models should be consistent with the constraints applied to the block designs to ensure predictable results when the hierarchical blocks and top level are integrated. In addition, electrical and operational factors should be taken into account in developing block constraints and timing models to allow timing to be closed without substantial surprises and redesign. Hierarchical design processes, or "flows," in existing commercial tools are based on extracted timing models, and as such, do not allow for concurrent block and top-level execution. They also provide no means of accounting for issues that only appear at final timing closure.

Introduced herein are various embodiments of a system and method for managing timing margin in a hierarchical IC design flow. In general, the system and method allow timing models and design constraints to be generated. Certain embodiments of the system and method allow control to be exercised over the margin (i.e., timing difference) between the timing model (i.e., external timing view) of a block and the constraints used for implementing the block. Generating the timing model and constraints from the same source and including margins increase the likelihood that hierarchical blocks can be successfully integrated in a top-level (e.g., system-on-a-chip, or SoC) design implemented concurrently with the block-level designs.

Through inclusion of the system or the method described herein, various embodiments encompass a set of tools in which margin is inserted into the process, or "flow," by which block timing constraints and models are generated. Individual margins (expressed in terms of commands provided to the set of tools) focus on specific timing issues, such as top-level clock-tree crosstalk and on-chip variation (OCV). Other margin commands provide a way to manage operational considerations, such as retaining timing margin in block timing constraints for a design known to be incomplete or undergoing significant change. In certain embodiments of the system and method, the margins are specified block-wide. In other embodiments, the margins are specified on a per-pin basis. In yet other embodiments, the margins may be specified either block-wide or on a per-pin basis. In one embodiment, the margins are specified as a fixed additive or subtractive values (e.g., in nanoseconds). In another embodiment, the margins are specified as a multiplier to existing constraint and timing arc values.

Embodiments to be illustrated and described herein enable a hierarchical design approach where lower-level blocks and the top-level design can proceed concurrently. Concurrent development is achieved by generating timing constraints for lower-level blocks and the timing models representing the blocks in the top-level design from a common timing budget. It has been discovered herein that a number of factors can appear in the final top-level sign-off timing environment, which, if not accounted for in advance, may require undesirable iterative changes to the top-level design or block-level designs to achieve timing closure. The term "retained margin" will be used herein to describe margin built into block-level timing constraints and timing models under user control to account for these factors and reduce, and perhaps altogether avoid, timing closure issues. The factors that impact top-level sign-off timing closure can be categorized as follows: 1) factors relating to the hierarchical modeling method employed, 2) factors relating to the top-level timing environment and 3) factors relating to design stability.

Abstracted View Margin

Several conventional tools capable of hierarchical modeling for top-level sign-off timing are commercially available today. These tools are capable of modeling by fully flattening blocks into the top level (no abstraction) to representing blocks by timing models (full abstraction). Techniques apart from hierarchical modeling tools include using separate parasitic extractions for the blocks and the top level with a full flat netlist, or using block parasitic extractions and netlists that include only portions of the blocks visible in top-level timing (e.g., as carried out in the Interface Logic Model of Prime-Time®, commercially available from Synopsys of Mountain View, Calif.). Unfortunately, in any flow in which blocks are represented differently in signoff timing than in top-level implementation, the correlation of the modeling methods will introduce some timing discrepancies. Unless the discrepancies happen to be such that the model used in implementation is more pessimistic than that used in sign-off timing, violations undetected during implementation may nonetheless appear at sign-off.

In various embodiments of the system and method introduced herein, a user-specified abstracted view margin is employed to offset at least some timing arcs in the block timing models in the appropriate direction to increase pessimism. In one embodiment, the abstracted view margin is used to offset all timing arcs in the block timing models. In the embodiments to be illustrated and described, timing arcs representing maximum values are made larger (more positive), while those representing minimum values are made smaller (more negative). In one embodiment, the abstracted view margin can be determined from correlation studies between the modeling method used in top-level implementation compared to that used in top-level signoff.

FIG. 1 is a diagram comparing timing arcs associated with top-level implementation and signoff models, depicting the application of an abstracted view margin. The X-axis reflects a signoff model timing arc, specifically one based on a full netlist/standard parasitic exchange format (SPEF). The Y-axis reflects a top-level implementation model timing arc. A line 110 represents the correlation between the signoff model timing arc and the top-level implementation model timing arc. A line 220 represents an abstracted view margin that is pessimistic with respect to the correlation line 110. FIG. 1 shows that all samples fall to the left of the line 120, signifying that timing can be closed for all samples given the abstracted view margin.

Figure 2:
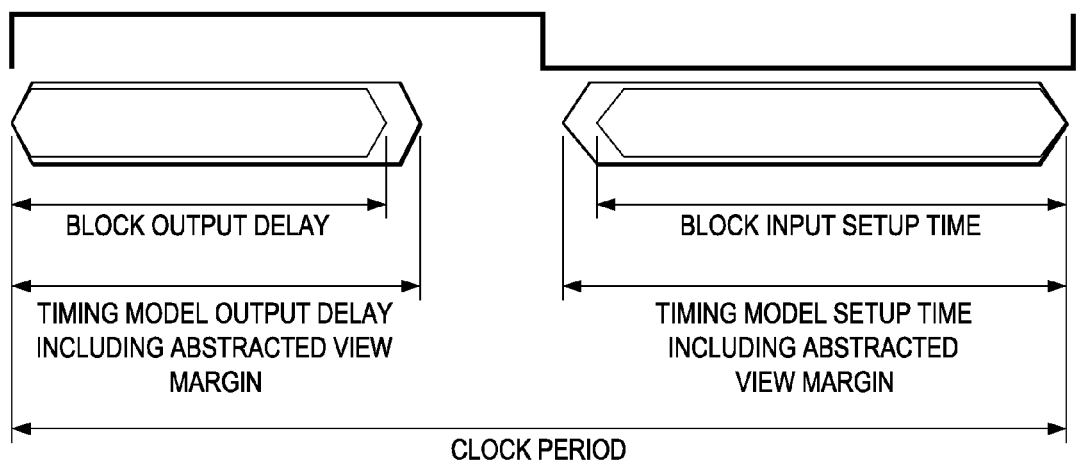
FIG. 2 is a diagram illustrating the impact of the abstracted view margin on timing model input and output timing arcs.

When applied during timing model generation, the abstracted view margin results in a timing model with sufficient pessimism to ensure all paths meet timing in the sign-off top-level timing environment. FIG. 2 is a diagram illustrating the impact of the abstracted view margin on timing model input and output timing arcs. One embodiment of the abstracted view margin pads the timing model output delay so a block output delay is highly likely to fit within it. Another embodiment of the abstracted view margin pads the timing model setup time so a block input setup time is highly likely to fit within it. Yet another embodiment of the abstracted view margin pads both the timing model output delay and the timing model setup time so the block output delay and the block input setup time are highly likely to fit respectively within them. In certain embodiments of the system and method, the abstracted view margin is specified block-wide. In other embodiments, the abstracted view margin is specified on a per-pin basis. In yet other embodiments, the abstracted view margin may be specified either block-wide or on a per-pin basis. In one embodiment, the abstracted view margin is specified as a fixed additive or subtractive values. In another embodiment, the abstracted view margin is specified as a multiplier to existing constraint and timing arc values.

Timing Environment Margins

Through the clock signals provided to lower-level blocks, the top-level timing environment can impact paths within the lower-level blocks as well as those that pass from block to block. Crosstalk in the top-level clock distribution network can shorten the period of the clock seen by the lower-level blocks and alter the relative timing (timing windows) of input signals to the blocks, affecting the timing impact of signal noise. Either of these cases can result in timing violations for paths entirely within lower-level blocks which meet their constraints at the block level. Various embodiments of the system and method disclosed herein address this issue by employing a user-specified top-level clock crosstalk margin, which is applied in block-level timing constraints as source latencies on the input clocks. In one embodiment, the clock crosstalk margin is applied as a positive late clock arrival. In another embodiment, the clock crosstalk margin is applied as a negative early clock arrival. In yet another embodiment, the clock crosstalk margin is applied as both a positive late clock arrival and a negative early clock arrival. In this embodiment, the block timing constraints reflect both period shortening and timing window effects, creating margin in the block designs to account for top-level clock crosstalk and avoiding problems in sign-off timing.

In a similar way, OCV in the top-level clock network can shorten the clock period impacting top-level block to block timing paths, resulting in timing violations even if each of the blocks and the top-level paths individually meet their timing constraints. Various embodiments of the system and method disclosed herein address this issue by employing a user-specified top-level clock OCV margin, which is applied as a tightening of the block input and output constraints. This creates margin in the block input and output timing to avoid top-level timing violations due to clock OCV.

In certain embodiments of the system and method, the clock crosstalk margin and the clock OCV margin are specified block-wide. In other embodiments, the clock crosstalk margin and the clock OCV margin are specified on a per-pin basis. In yet other embodiments, the clock crosstalk margin and the clock OCV margin may be specified either block-wide or on a per-pin basis. In one embodiment, the clock crosstalk margin and the clock OCV margin are specified as fixed additive or subtractive values. In another embodiment, the clock crosstalk margin and the clock OCV margin are specified as multipliers to existing constraint and timing arc values.

Operational Margins

Figure 3:
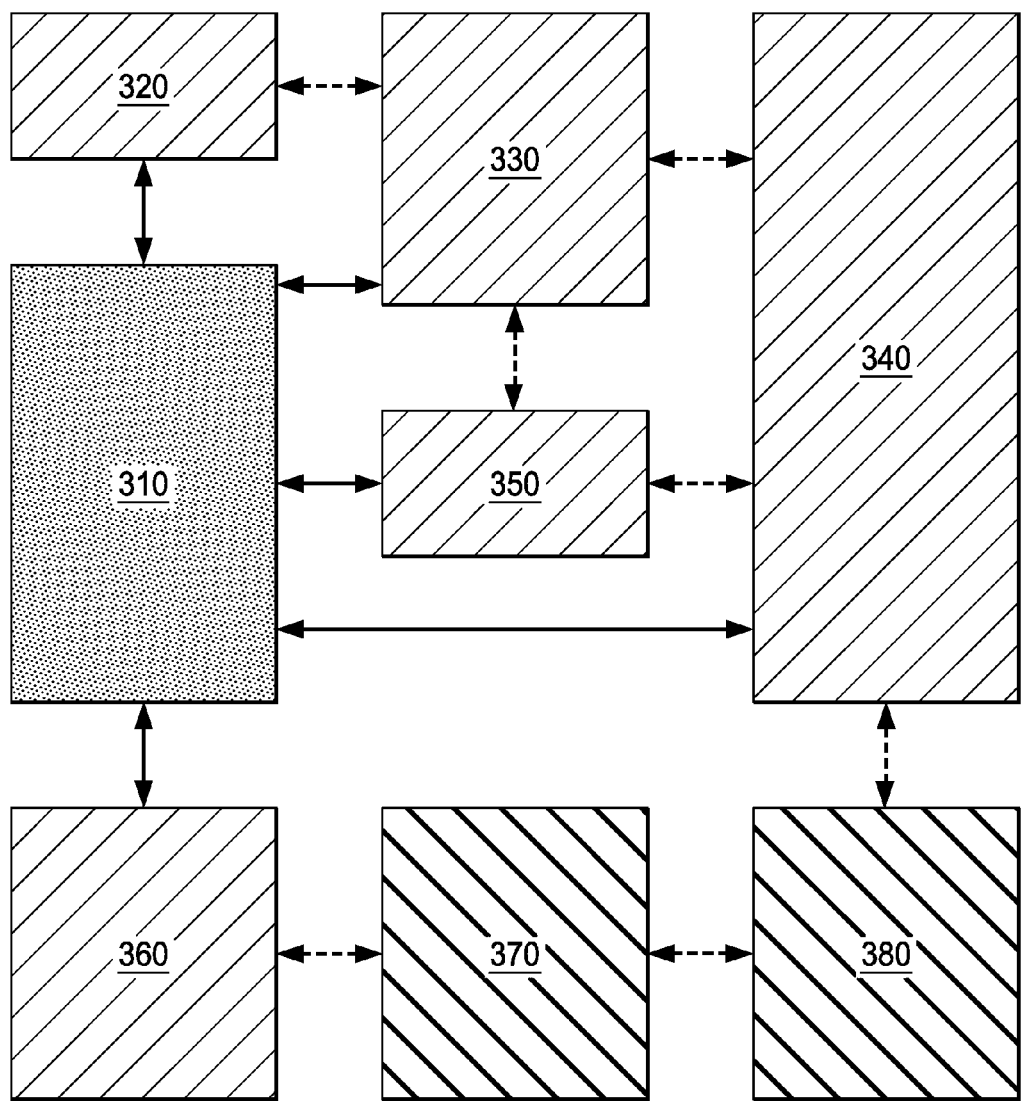
FIG. 3 is a diagram showing an example of the manner in which design changes in one lower-level block can effect the design of other lower-level blocks or the top-level design.

Instability in block timing can present problems to completion of a hierarchical design when the design of some lower-level blocks is completed before others. When one or more lower-level blocks are known to be incomplete or are undergoing significant changes, they pose a risk to completion of the top-level design as well as other lower-level blocks. FIG. 3 is a diagram showing an example of the manner in which design changes in one lower-level block can affect the design of other lower-level blocks or the top-level design. As an example a block 310 is incomplete or undergoing significant changes. As a result, blocks 320, 330, 340, 350, 360 are at-risk by virtue of their direct interaction with the block 310. Because blocks 370, 380 do not directly interact with the block 310, the blocks 370, 380 may be properly regarded as stable.

Various embodiments of the system and method disclosed herein address this issue by employing two user-specified margins, a block isolation margin and a block constraint margin, that can be used to tighten block timing constraints or add pessimism to block timing models. The block isolation margin is a margin increasing the pessimism of block models. The block constraint margin is a margin tightening block input and output constraints. The block isolation margin and the block constraint margin together provide a way to inject margin to isolate the top-level and other lower-level blocks from changes that may occur in changing blocks. In certain embodiments of the system and method, the block isolation margin and the block constraint margin are specified block-wide. In other embodiments, the block isolation margin and the block constraint margin are specified on a per-pin basis. In yet other embodiments, the block isolation margin and the block constraint margin may be specified either block-wide or on a per-pin basis. In one embodiment, the block isolation margin and the block constraint margin are specified as fixed values. In another embodiment, the block isolation margin and the block constraint margin are specified as multipliers to existing constraint and timing arc values. Whereas without the block isolation margin and the block constraint margin, the blocks 320, 330, 340, 350, 360 were at-risk, with the block isolation margin and the block constraint margin, the blocks 320, 330, 340, 350, 360 may also be regarded as stable.

Figure 4:
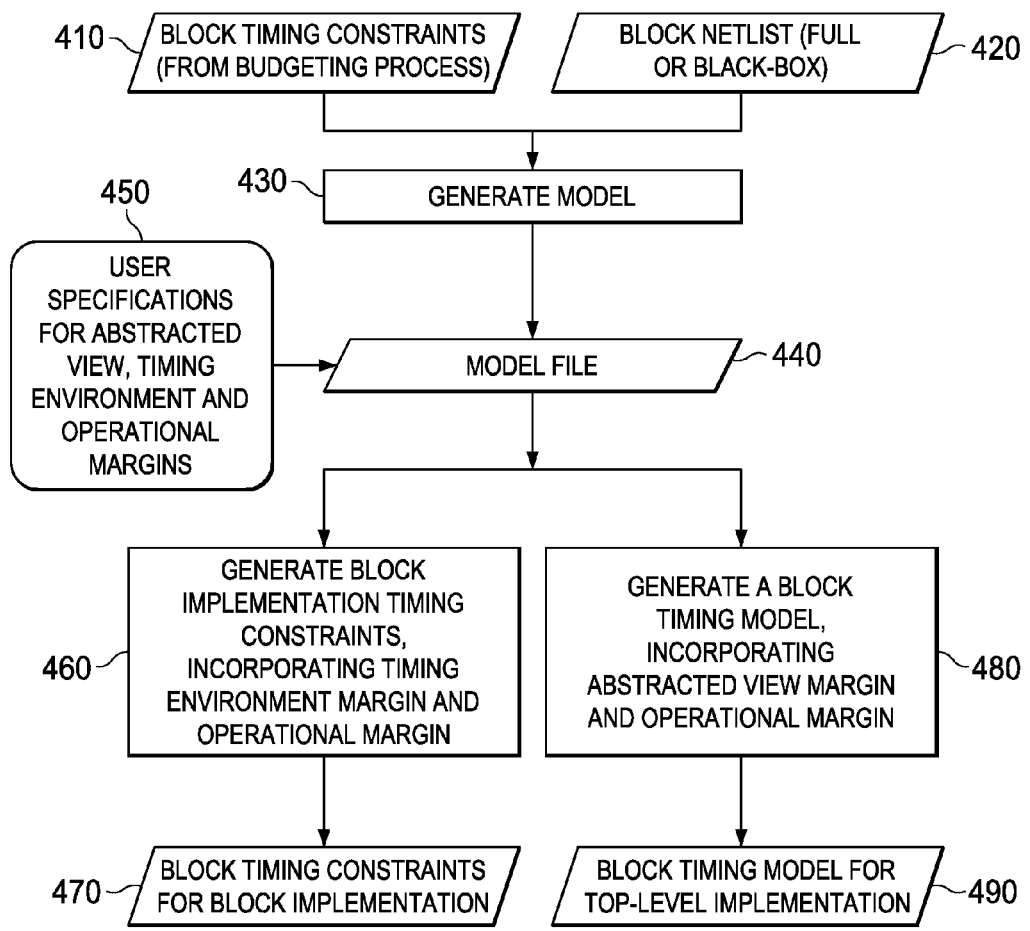
FIG. 4 is a hybrid block and flow diagram of one embodiment of a system and method for generating block timing constraints and a timing model.

Having described the abstracted view margin, the environmental timing margins (the clock crosstalk margin and the clock OCV margin) and the operational margins (block isolation margin and the block constraint margin), a flow involving various embodiments of the system or method introduced herein will now be described. FIG. 4 is a hybrid block and flow diagram of one embodiment of a system and method for generating block timing constraints and a timing model. Block timing constraints 410 from a budgeting process and a block netlist 420 (either a full netlist containing no abstractions or a netlist containing at least some abstractions) are provided to a hierarchical modeling tool to generate a model in a step 430, resulting in a model file 440. In an alternative embodiment, an existing model file is modified rather than generated. User specifications for one or more abstracted view margins, one or more timing environment margins and one or more operational margins 450 are provided to the model file 440. As FIG. 4 illustrates, a user input is configured to provide the user specifications for the one or more abstracted view margins, the one or more timing environment margins and the one or more operational margins 450 to the model file 440.

From this point, the embodiment of FIG. 4 bifurcates. The model file 440 is employed in a step 460 to generate block implementation timing constraints, incorporating the one or more timing environment margins and the one or more operational margins. Block timing constraints for block implementation 470 result from the step 460. The model file 440 is also employed in a step 480 to generate a block timing model, incorporating the one or more abstracted view margins and the one or more operational margins. A block timing model for top-level implementation 490 result from the step 480.

Those skilled in the art to which this application relates will appreciate that other and further additions, deletions, substitutions and modifications may be made to the described embodiments.

What is claimed is:

1. A system for generating block timing constraints and a timing model, comprising:
a hierarchical modeling tool configured to:
receive at least one abstracted view margin, at least one timing environment margin and at least one operational margin for inclusion in a model file,
generate block implementation timing constraints employing said at least one timing environment margin and said at least one operational margin, and
generate a block timing model employing said at least one abstracted view margin and said at least one operational margin.

2. The system as recited in claim 1 wherein at least one of said at least one abstracted view margin, at least one timing environment margin and at least one operational margin is specified block-wide.

3. The system as recited in claim 1 wherein at least one of said at least one abstracted view margin, at least one timing environment margin and at least one operational margin is specified on a per-pin basis.

4. The system as recited in claim 1 wherein at least one of said at least one abstracted view margin, at least one timing environment margin and at least one operational margin is specified as a fixed additive or subtractive value.

5. The system as recited in claim 1 wherein at least one of said at least one abstracted view margin, at least one timing environment margin and at least one operational margin is specified as a multiplier to existing constraint and timing arc values.

6. The system as recited in claim 1 wherein said at least one abstracted view margin is determined from correlation studies between a modeling method used in top-level implementation and a modeling method used in top-level signoff.

7. The system as recited in claim 1 wherein said at least one timing environment margin includes at least one of a top-level clock crosstalk margin and a top-level clock OCV margin.

8. The system as recited in claim 7 wherein said top-level clock crosstalk margin is applied in block-level timing constraints as source latencies on input clocks.

9. The system as recited in claim 1 wherein said at least one operational margin includes at least one of a block isolation margin and a block constraint margin.

10. A method of generating block timing constraints and a timing model, comprising:
    receiving, using a computer, at least one abstracted view margin, at least one timing environment margin and at least one operational margin for inclusion in a model file;
    generating block implementation timing constraints employing said at least one timing environment margin and said at least one operational margin; and
    generating a block timing model employing said at least one abstracted view margin and said at least one operational margin.

11. The method as recited in claim 10 further comprising specifying at least one of said at least one abstracted view margin, at least one timing environment margin and at least one operational margin block-wide.

12. The method as recited in claim 10 further comprising specifying at least one of said at least one abstracted view margin, at least one timing environment margin and at least one operational margin on a per-pin basis.

13. The method as recited in claim 10 further comprising specifying at least one of said at least one abstracted view margin, at least one timing environment margin and at least one operational margin as a fixed additive or subtractive value.

14. The method as recited in claim 10 further comprising specifying at least one of said at least one abstracted view margin, at least one timing environment margin and at least one operational margin as a multiplier to existing constraint and timing arc values.

15. The method as recited in claim 10 further comprising determining said at least one abstracted view margin from correlation studies between a modeling method used in top-level implementation and a modeling method used in top-level signoff.

16. The method as recited in claim 10 wherein said at least one timing environment margin includes at least one of a top-level clock crosstalk margin and a top-level clock OCV margin.

17. The method as recited in claim 16 further comprising applying said top-level clock crosstalk margin in block-level timing constraints as source latencies on input clocks.

18. The method as recited in claim 10 wherein said at least one operational margin includes at least one of a block isolation margin and a block constraint margin.

19. A non-transitory computer-readable storage medium containing program instructions for generating block timing constraints and a timing model, execution of said program instructions by one or more processors of a computer system causing said one or more processors to:
    receive at least one abstracted view margin, at least one timing environment margin and at least one operational margin for inclusion in a model file;
    generate block implementation timing constraints employing said at least one timing environment margin and said at least one operational margin; and
    generate a block timing model employing said at least one abstracted view margin and said at least one operational margin.

20. The medium as recited in claim 19 wherein said one or more processors of said computer system cause said one or more processors to specify at least one of said at least one abstracted view margin, at least one timing environment margin and at least one operational margin one of block-wide and on a per-pin basis.

* * * * *